United States Patent
Sammons et al.

(10) Patent No.: US 8,800,752 B2
(45) Date of Patent: Aug. 12, 2014

(54) PORTABLE CONTINUOUS FEED DELIVERY SYSTEM AND METHOD OF USE

(76) Inventors: David W. Sammons, Union City, TN (US); Donald G. Bruce, Whiteville, TN (US)

(*) Notice: Subject to any disclaimer, the term of this patent is extended or adjusted under 35 U.S.C. 154(b) by 121 days.

(21) Appl. No.: 13/474,213

(22) Filed: May 17, 2012

(65) Prior Publication Data
US 2013/0305995 A1    Nov. 21, 2013

(51) Int. Cl.
*B65G 47/44* (2006.01)

(52) U.S. Cl.
USPC ............... 198/568; 198/550.4; 198/550.5; 198/564

(58) Field of Classification Search
USPC ........... 198/529, 530, 531, 542, 545, 550.01, 198/550.4, 550.5, 550.6, 550.8, 564, 568
See application file for complete search history.

(56) References Cited

U.S. PATENT DOCUMENTS

| | | | | |
|---|---|---|---|---|
| 3,091,368 A * | 5/1963 | Harley et al. | ............... | 222/56 |
| 3,580,548 A | 5/1971 | Moore | ............... | 259/95 |
| 4,241,700 A | 12/1980 | Cobb | ............... | 119/52 |
| 4,323,178 A * | 4/1982 | Longinotti | ............... | 222/415 |
| 4,364,334 A | 12/1982 | Williams | ............... | 119/52 |
| 4,375,791 A | 3/1983 | Peppler | ............... | 119/52 |
| 4,495,894 A | 1/1985 | Swartzendruber | ............... | 119/51 |
| 4,640,230 A | 2/1987 | Van Rooijen | ............... | 119/52 |
| 4,680,507 A * | 7/1987 | Uemura et al. | ............... | 315/111.81 |
| 4,708,534 A * | 11/1987 | Gallant | ............... | 406/75 |
| 4,844,017 A | 7/1989 | Lackner | ............... | 119/52 |
| 5,062,389 A | 11/1991 | Krehl | ............... | 119/57.6 |
| 5,596,946 A | 1/1997 | Bryant et al. | ............... | 119/52.1 |
| 5,657,902 A * | 8/1997 | Kraus | ............... | 222/56 |
| 5,697,327 A | 12/1997 | Pollock | ............... | 119/574 |
| 5,899,169 A | 5/1999 | Jenson | ............... | 119/51.13 |
| 5,964,551 A * | 10/1999 | Wallace | ............... | 406/32 |
| 6,263,833 B1 | 7/2001 | Runyan et al. | ............... | 119/51.11 |
| 6,474,261 B1 | 11/2002 | Turner et al. | ............... | 119/53 |
| 7,353,935 B2 * | 4/2008 | Oury et al. | ............... | 198/550.2 |
| 8,496,135 B2 * | 7/2013 | Hoff et al. | ............... | 222/1 |

FOREIGN PATENT DOCUMENTS

| | | | | |
|---|---|---|---|---|
| DE | 4231911 | 10/1998 | ............ | A01K 31/17 |
| EP | 0 040 003 | 11/1981 | ............ | A01K 39/12 |
| GB | 1 412 537 | 11/1975 | ............ | A01K 5/02 |
| JP | 2002-272296 | 9/2002 | ............ | A01K 5/02 |

OTHER PUBLICATIONS

Liyang Rongda Feed Equipment Co., "CE/GOSRT/SG Minisite Survey Poultry Feed Pellet Plant" http://ly-rd.alibaba.com/product/506972472-212910154/Poultry_Feed_Pellet_Plant.html. pp. 1-5 (printed Nov. 2013).
U.S. Dept. of Agriculture, "Commercial Broiler Production Agriculture Handbook No. 320" pp. 1-64 (1967).

* cited by examiner

*Primary Examiner* — Douglas Hess
(74) *Attorney, Agent, or Firm* — David G. Rosenbaum; J. Peter Paredes; Rosenbaum IP, P.C.

(57) ABSTRACT

A portable feed delivery system can have a first feed container including a first conveyor apparatus that delivers feed to a second feed container, where a second conveyor apparatus delivers feed to a feed delivery conduit that can be directed by a user.

20 Claims, 7 Drawing Sheets

PORTABLE CONTINUOUS FEED DELIVERY SYSTEM AND METHOD OF USE

BACKGROUND OF THE INVENTION

As presently practiced in most commercial broiler houses, after ten days, the feed is delivered automatically to feed pans positioned in a line and spaced to provide feed access for all chickens around the feed pan. However, the automated system only works when chicks are large enough to eat from the pan and have been properly trained and conditioned to feed from the pans and to trigger the automatic fill mechanisms. Initially, when baby chicks are placed, the baby chicks are too small to reach the pans for the first 10 days of growth. Grower/farmer is required to place a large number of trays alongside and surrounding the automated feed pans. It is mandatory for the grower/farmer to use the tray supplementary feeding because the broiler outcome in average daily gains and feed conversion depends on feed availability during the first 10 days of life. The best management practice demands that ample feed is immediately available when placement is made and during the brooding when chick needs to find feed rapidly. The trays are placed between and on either side of the automated feed pans and around brooding heaters when available. Presently these trays are filled manually.

The manual filling of the supplemental feed tray is very strenuous work. Since the physical energy and labor required for the filling task is enormous, a typical grower/farmer cannot accomplish the task alone. Further, the probability of injury, even to physically fit individuals, is great due to repetitive scooping and carrying buckets of feed to fill the trays, since a bucket of feed weighs about 35 pound. The strenuous nature of the work often eliminates many elderly growers from participating in this activity because they are not physically able to fill the trays manually.

A typical broiler farm with six houses has to hire additional labor to perform the work. The average expectation to fill the trays manually for six houses with buckets is six people, in addition to the grower/farmer, working about 10 hours. At this pace, the trays in one house are filled in 1.7 hour or at a time cost of 10 man hours of hired labor to accomplish the task. Presently, the industry has not had a successful feed delivery system for filling the supplemental trays for the very young chicks. In the past, an approach was tried by using an overhead feed cart on an elevated trolley that is operator controlled. In this effort, feed is delivered down the trolley in an overhead hopper which is delivered to the trays via an auger to a flexible hose directed by the operator. This approach works best in houses that do not have automatic feed lines since the rigging has to be dropped to the floor out of the way during the first two weeks if the house has an automated feed system. Further, the trolley idea was proposed prior to the use of equipment such a windrowing, automated distribution of bedding with a large truck, overhead permanent heaters, and automated drinkers and feed lines that hang from the building ceilings. In addition, many of the modern broiler houses have ceilings even lower than previous ones to facilitate greater wind speed when operating in tunnel and offer even less space to house a permanent trolley. Thus, in conclusion, physical obstructions, such as trolleys, are detrimental to accessibility and wind speed in modern houses and the apparatus was not accepted by the industry.

Another approach called the "Feed Caddy" is pulled behind a small tractor or ATV during which paper is rolled out onto which feed is automatically dropped. This approach is an improvement in that it does eliminate much of the physical effort and can be operated faster than manual delivery of feed. The chicks waste considerable feed off the paper and moisture may contribute to rapid disintegration of the paper before 10 days has elapsed; thereby, causing shortage of feed availability for some chicks that will get a slow start. With this "Feed Caddy" apparatus, the feed still cannot be delivered into supplemental trays. Trays are still required, as noted above. Thus, feed may be unavailable for some chicks with the "Feed Caddy" method.

In spite of the aforementioned methods, the broiler industry grower/farmer still must use supplementary trays. The present practice of providing ample quantity of feed for all chicks during this critical time is met by surrounding the automated feed pans and floor heaters with flat shallow trays and then filling each of these trays with feed from scoops or buckets. The manual fill of trays by pouring feed from a scoop or bucket is exhausting, since a typical broiler house of 23,000 chicks requires 250 trays or about 2600 pound of feed and more if a large modern house exists. Today, most growers/farmers transport feed in a cart pulled with an ATV or fill the back of a pickup truck with feed and then manually scoop out and transfer the feed into trays, usually with 5 gallon buckets.

The portable feed delivery system allows mounting and dismounting of the entire system from the transport vehicle after filling the trays; thereby, cost effectively freeing the vehicle for other uses. Another object is to use proven and mechanically reliable components to meet the reliability requirement of this critical poultry feed delivery application. Its ease of assembly, durability, and low cost of manufacturing supports rapid market penetration. Thus, the portable feed delivery system provides a scalable capacity with bulk quantities of feed in a mechanically simple portable continuous feed system while freeing the operator from tedious control needed to deliver feed reliably into a small tray without waste.

Using this portable feed delivery system, two individuals can easily complete the tray filling operation for 23,000 chicks within 26 minutes and allowing another 20 minutes to fill the portable feed box. The total time is 46 minutes per house. With this portable feed delivery system, the object is for the grower/farmer to be the operator controlling the delivery of the feed into the tray and only one other person is required to drive the transport vehicle. This translates into 1 man hour of hired labor to fill the trays using the Portable Continuous Feed Delivery System per house. A comparison of this invention method (1 worker for 1 hr) with the manual method (6 hired workers for 1.7 hr) illustrates a 10 fold increased efficiency of effort over the manual method of filling normally practiced in the broiler industry. Thus, the portable feed delivery system enables growers to reduce the variable labor cost associated with short out-times and narrow profit margins since the grower and one other person can perform the entire work in a shorter time and with less effort.

Another major object of this invention is the ease of use of this invention, which enables elderly growers/farmers of either gender to perform the work without risk of physical breakdown or injury due to heavy lifting or twisting while walking with and empting loaded feed buckets. Another object of the invention provides a feed delivery system that is suitable for use by women, elderly, and individuals with minor physical limitations. Thus, a broader object of the invention is to allow elderly growers to continue growing broilers even as they become more infirm, or even begin a broiler operation business during their retirement years.

The portable feed delivery system provides an appropriate continuous stream of feed at a high flow rate (100 pounds per minute), to be capable of delivery of feed into asymmetrically positioned target trays without waste, to direct the stream of feed into shallow trays, and to provide easy control of the feed stream by the operator.

SUMMARY OF THE INVENTION

The present invention relates generally to a portable feed delivery system that delivers an adjustable rate of feed flow controlled by auger size and hydraulic oil flow rate. More specifically, the continuous feed delivery is easily directed into trays by the operator pointing a delivery conduit as he/she walks along filling each tray sequentially. The portable feed delivery system delivers a continuous stream of feed that can be mounted or dismounted from a transport vehicle.

In accordance with one embodiment, a first feed container is mounted via side jacks onto the bed of a half-ton pickup, or is lifted via a fork lift on a skid steer or front end loader of a tractor. The first feed container with its lid open is positioned under a drop tube on the main feed line auger that brings feed from an external feed bin into the broiler house. The first feed container is filled sufficiently to fill all or a portion of the trays in the house with 23,000 birds. Since there is excess capacity in the first feed container, additional feed may be added when larger houses are serviced.

The vehicle is then moved forward and aligned approximately three feet parallel to the row of feed trays surrounding the automatic feed line and associated feed pans. At this time, the operator starts the generator or gasoline powered engine that provides the electric power for the first and second electric motors coupled to the feed conveyors. Alternatively, if a gasoline engine is used, a skid steer or tractor is used to pump the hydraulic oil, the motors coupled to the two conveyors are activated as the oil is pumped through the system. Oil valves are adjusted to preset positions to deliver 100 pounds of feed per minute; however, the operator can adjust the valve to a slower fixed rate of feed delivery by adjusting the manual valve that is conveniently positioned near the operator on a fold out arm. Regardless of which method is used to power the conveyors, either the electric switches or the hydraulic oil valves, both feed conveyors transport the feed toward the outlets simultaneously. The first feed container outlet door is adjusted so that the output of the first feed container equals the output of the second feed container, and the feed exits the second feed container from a flexible tube and plastic outlet into the feed tray as a steady stream of feed.

The forward motion and ground speed of the transport vehicle is adjusted by the driver to match the momentum of the tray filling action of the feed as directed by the operator holding the light weight sliding plastic tube. As the trays fill, the operator walks to the next tray and points the end of the tube toward the tray as the feed exits by force of gravity. The operator fills each tray in succession and avoids waste by rapidly moving the tube from one tray to the other. The trays are previously positioned adjacent to each other before commencing the fill operation. When the trays are not positioned next to one another, the operator can open or close the outlet by manually operating a handle mechanism which controls the flow of feed out of the feed tube.

Upon reaching the end of the trays along one feed line, the transport vehicle is repositioned on the opposite parallel side of the house and the second feed conveyor is moved from the cradle on one side to the cradle on the other side of the second feed container if the river then proceeds in the reverse direction as the operator continues to direct the continuous flow of feed into the trays.

After filling the last tray, the first and second conveyors are shut off, the feed conduit is placed in a stable position, and the driver proceeds to the next broiler house where he positions the first feed container under the drop tube for filling. The procedure is then repeated for each house until all trays are filled.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE PREFERRED EMBODIMENTS

Figure 1A:
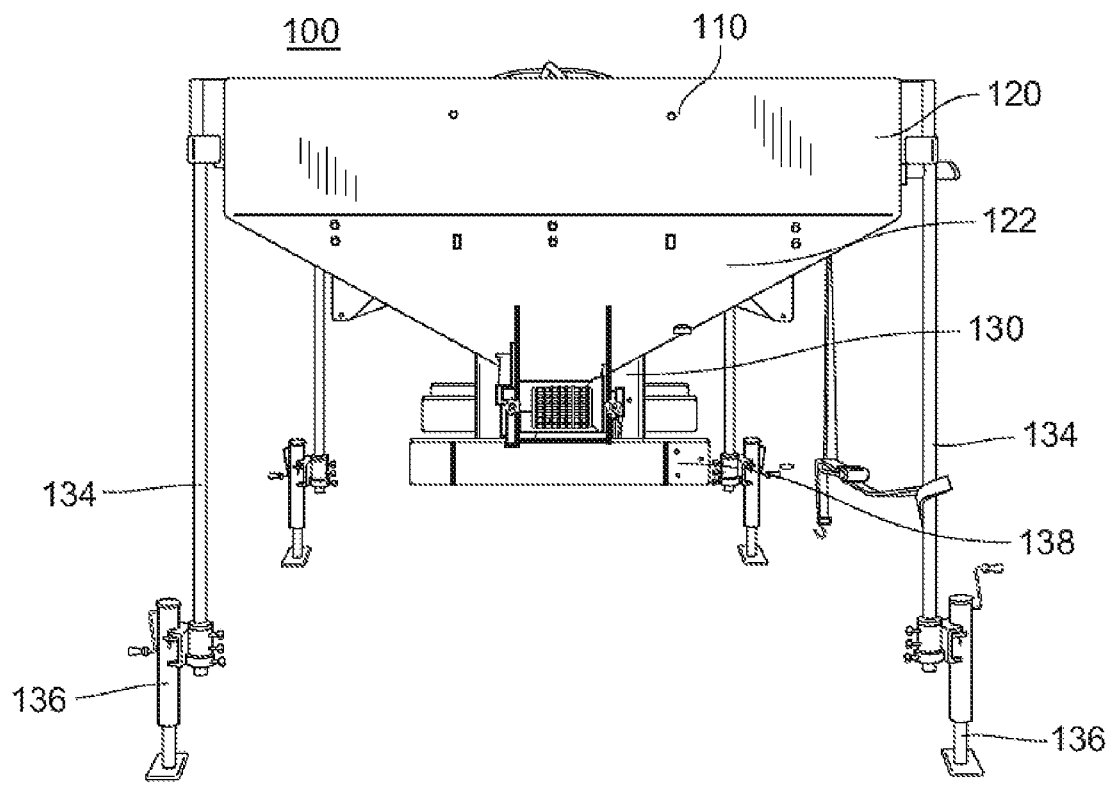
FIG. 1a shows a front view of a feed delivery system.

Referring to FIG. 1a, an embodiment of a portable feed delivery system 100 comprises a first feed container 110. The capacity of the first feed container 110 is configured to hold at least 4,000 pounds of feed. Alternatively, the first feed container 110 may hold between at least 100-10,000 pounds of feed. The first feed container 110 includes a plurality of walls defining an internal volume having vertical regions 120 and angled regions 122 that are sloped and merge in the center of the first feed container 110 into a trough 130. For example, the first feed container 110 may have the dimensions of 9 feet in length, 7 feet wide, and 3 feet deep, and the trough 130 may have the dimensions of about 12 inches deep, about 12 inches wide, and about 9.5 feet long extending the horizontal length of the first feed container 110. Alternatively, the first feed container 110 may have alternative dimensions of between about 2 to 50 feet in length, 2 to 50 feet in width, and 1 to 20 feet in depth. Alternatively, the trough 130 may have alternative dimensions of between about 1-50 inches in depth, about 1-50 inches in width, and about 1 to 50 feet in length. The dimensions of the first feed container 110 and the trough 130 may be altered as to best suit a particular type of feed, delivery system, and the like. Furthermore, the trough 130 comprises an aperture 132 in the dispensing end of the trough 130. The shape of the first feed container 110 is generally rectangular; however, the shape of the first feed container may be any polygonal shape, such as square, trilateral, pentagonal, hexagonal, circular, elliptical, and the like.

The first feed container 110 may further comprise a plurality of detachable support legs 134 removably attached to an outside surface of the first feed container 110 and extending generally downward. The detachable support legs 134 may be used to attach the portable feed delivery system 100 to a lift system to facilitate the attachment of the portable feed delivery system 100 to a transport vehicle, such as a truck, including pickup trucks, or any other vehicle having an open load bay.

The portable feed delivery system 100 may further comprise a plurality of lifters 136. Each of the lifters 136 are associated with one of the detachable support legs 134 and are configured to vertically lift the portable feed delivery system 100 to facilitate installment onto the transport vehicle. In one embodiment, the lifters 136 are jacks that are manually operated and allow the lifting of the system in order to clear the pickup bed and then be lowered onto the bed for operation installation. Alternatively, the lifters 136 may be electronic or hydraulic lifters and may shift the horizontal position of the portable feed delivery system 100 if need be. Furthermore, the first feed container 110 may comprise one or more attachment members 138 on the bottom end of the trough 130 for attachment to said transport vehicle. The attachment members 138 may be generally vertical planks to stabilize the first feed container 110 during transport.

Figure 1B:
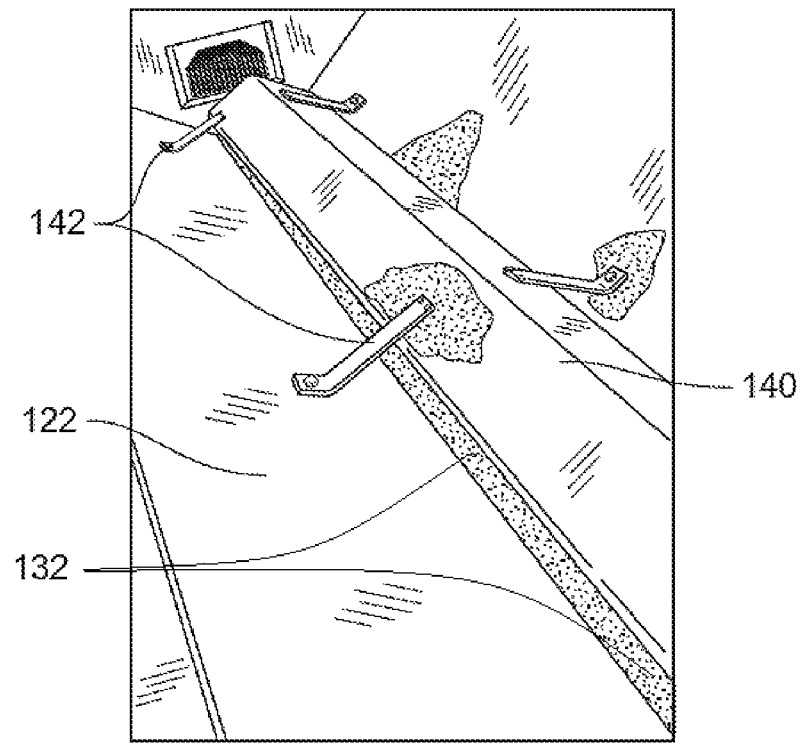
FIG. 1b shows a perspective view of the inside of a first feed container, showing a baffle.

The first feed container 110 further comprises a baffle 140, shown in FIG. 1*b*, disposed above the rectangular trough 130. The baffle 140 includes at least two generally angled surfaces. The baffle 140 is positioned within the first feed container 110 to create a gap between the angled regions 122 and the aperture 132, and the baffle 140 facilitates the transmission of feed into the trough 130. The baffle 140 is attached to and supported by the angled regions 122 by a plurality of support members 142. The support members may be attached to both the baffle 140 and the angled regions 122 by any appropriate means, including fasteners, bolts, screws, welding, and the like. The number of support members 142 and location of attachment to the baffle 140 and the angled regions 122 may be adjusted to provide sufficient strength to support the feed contained by the first feed container 110. In a further embodiment, the first feed container 110 comprises one or more doors (not pictured) configured to cover the open upper surface of the first feed container 110. The doors may connect to or hinge with at least one of the vertical regions 120 of the first feed container 110.

Figure 2:
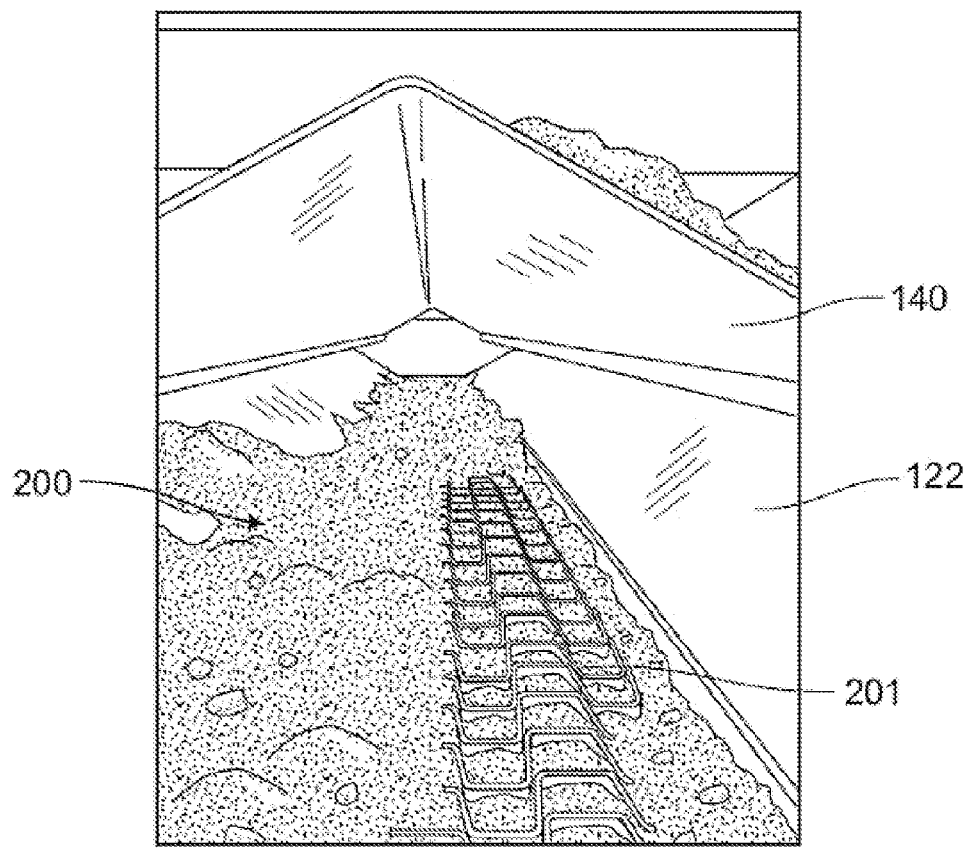
FIG. 2 shows a view of the first conveyer apparatus and the baffle.

The feed delivery system 100 further comprises a first conveyor apparatus 200 disposed within and running along the length of the trough 130, as shown in FIG. 2. The first conveyor apparatus 200 is configured to receive feed contained by the first feed container 110 through the gap between the baffle 140 and the angled regions 122. The first conveyor apparatus 200 comprises a first conveyor 201 which may be any type of belt conveyor known in the industry, including chain belt conveyors, rubber belt conveyors, augers, and the like. In one embodiment, the first conveyor 201 includes a plurality of apertures walled by metal walls as to transport feed.

The first conveyor 201 comprises a belt, for example, a 7" wide chain belt functionally coupled to a first sprocket located beyond the dispensing end of the first feed container 110 and a second sprocket located towards the non-dispensing end of the first feed container 110. The first and second sprockets are positioned to position the chain such that it will move feed out the dispensing end of the first feed container 110. The first sprocket is operably associated with a first driving mechanism which is operably associated with a power source. When the first sprocket is turned by the driving mechanism, it in turn moves the belt coupled thereto. Furthermore, the second sprocket is coupled to the belt and configured to rotate freely, thereby providing support at the non-dispensing end for the belt while simultaneously permitting the belt to move freely. In the present embodiment, the driving mechanism comprises a hydraulic motor operably associated with a hydraulic pump.

The speed of the first conveyor 201 can be optionally adjusted to control the rate of feed delivery. In the present embodiment, the speed of operation of the hydraulic motor can be increased or reduced to adjust the rate of turning the drive sprocket, accordingly adjusting the speed of the first conveyor 201. The speed of operation of the hydraulic motor is controlled by the rate at which hydraulic fluid is delivered to the hydraulic motor. The hydraulic fluid delivery rate can be controlled by one or more oil valves. For example, the oil valves can be configured to have a preset position corresponding to an optimal feed delivery rate of 100 pounds per minute, alternatively, between 10-100 pounds per minute, alternatively, between 50-100 pounds per minute, alternatively between 80-100 pounds per minute.

In a further embodiment, the driving mechanism comprises an electric motor operably associated with an electricity source. For instance, the electricity source comprises a generator or a battery operably associated with an engine, such as an internal combustion engine. In this embodiment, the electric motor is configured to control its rate of operation to control the rate of turning of the drive sprocket, accordingly adjusting the speed of the first conveyor 201.

Figure 3:
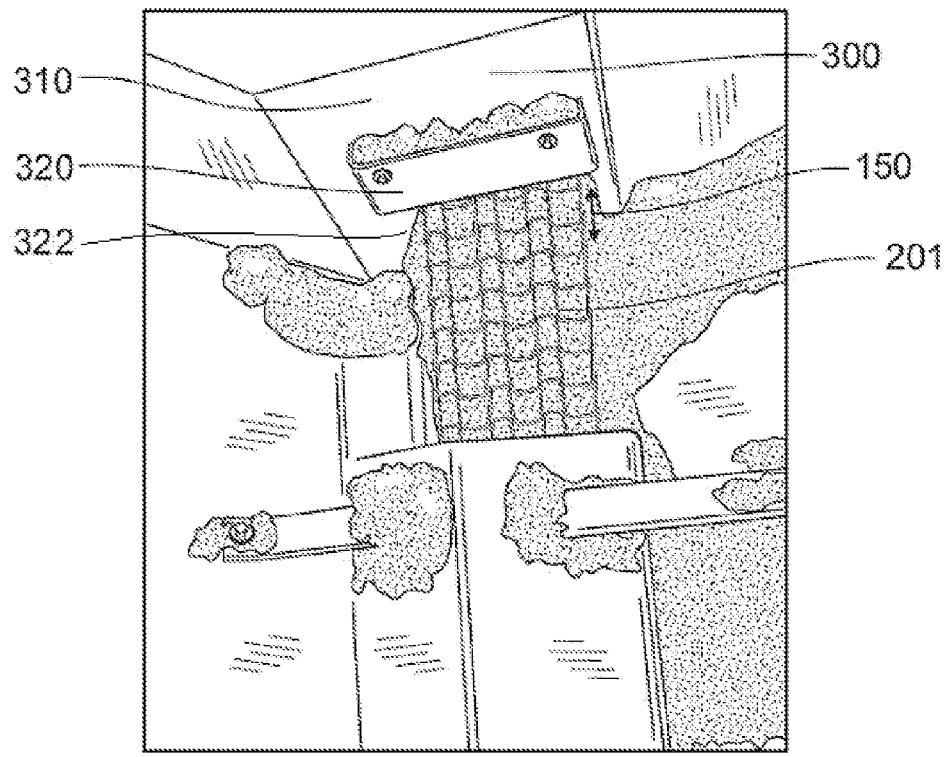
FIG. 3 shows a top view of the first conveyer apparatus and a feed dispensing controller.

The first feed container 110 further comprises a feed dispensing controller 300 in the dispensing end of the first feed container 110, shown in FIG. 3. The feed dispensing controller 300 includes a body member 310 and a flow restrictor 320 attached to a lower end of the body member 310 forming a gap 322 between the lower edge of the flow restrictor 320 and the first conveyor 201. The body member 310 may be vertically translated, thereby changing the vertical position of the flow restrictor 320 and, hence, between the flow restrictor 320 and the first conveyor 201. As the first conveyor 201 moves in directions 150, feed from the first feed container 110 is conveyed to and through the gap 322. By changing the vertical position of the flow restrictor 320, the rate of delivery of feed through the gap 322 may accordingly be changed. For example, if the first conveyor 201 is moving at a faster rate, the amount of feed may be greater and higher on the first conveyor 201, so the gap 322 may have be enlarged by vertically changing the position of the body member 310 to a higher position. The vertical position may be changed such as by slidable movement, hatchet mechanisms, screw mechanisms, and the like.

Figure 4:
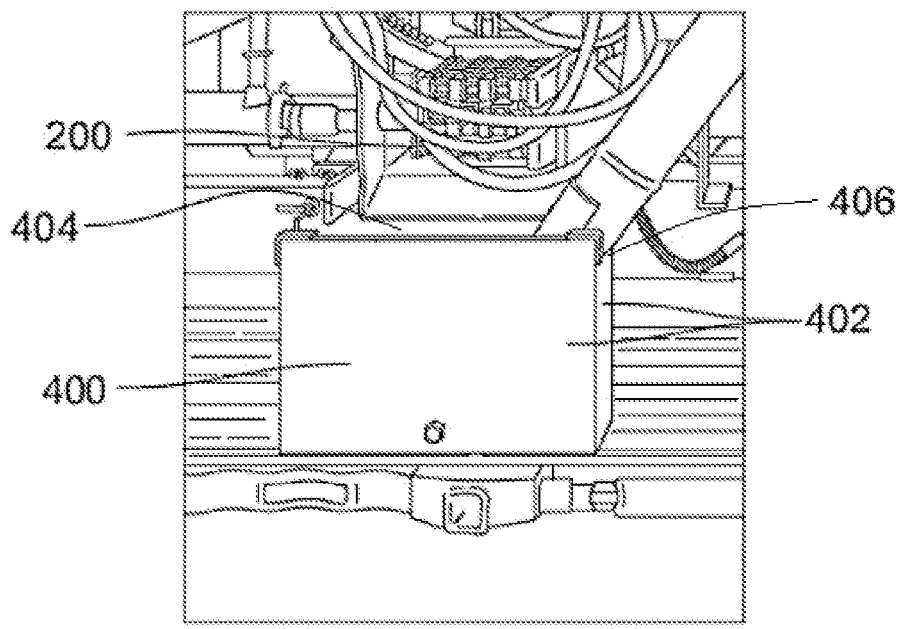
FIG. 4 shows a front view of a second feed container.
Figure 6:
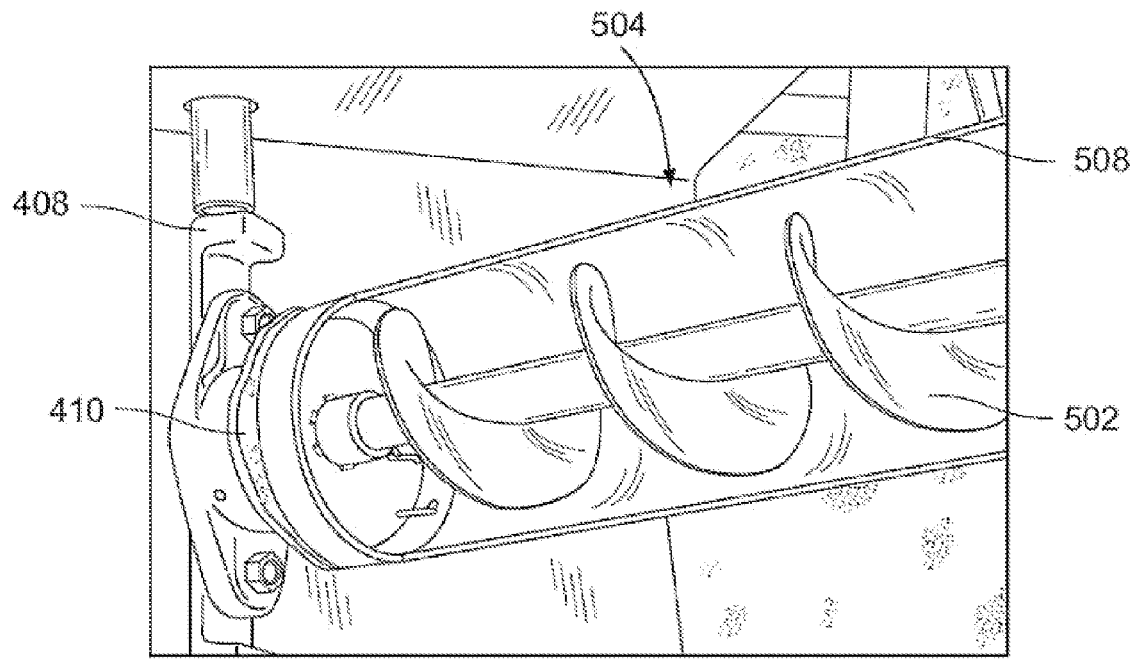
FIG. 6 shows a top view of a second conveyor in the second conveyor apparatus disposed within the second feed container.

Referring to FIG. 4, the portable feed delivery system 100 further comprises a second feed container 400. The second feed container 400 is located below the dispensing end of the first conveyor apparatus 200. The second feed container 400 comprises a lower surface (not shown) and a plurality of walls 402 defining an internal volume and an open upper area 404. The second feed container 400 is positioned such that feed that is moved off the dispensing end of the first conveyor 200 falls into the internal volume of the second feed container 400 via the open upper area 404. In one embodiment, the second feed container 400 has the dimensions of 1 foot deep, 1.5 feet wide and 2 feet long. The second feed container 400 further comprises one or more cutouts 406 on top of at least one of the plurality of walls 402 as to receive a second conveyor apparatus 500. Furthermore, the second feed container 400 comprises a conveyor attachment structure 408 located within the internal volume, as shown in FIG. 6. In one embodiment, the conveyor attachment structure 408 is configured to rotate about its longitudinal axis. The lower surface of the second feed container 400 defines a lowest point for the portable feed delivery system 100.

Figure 5:
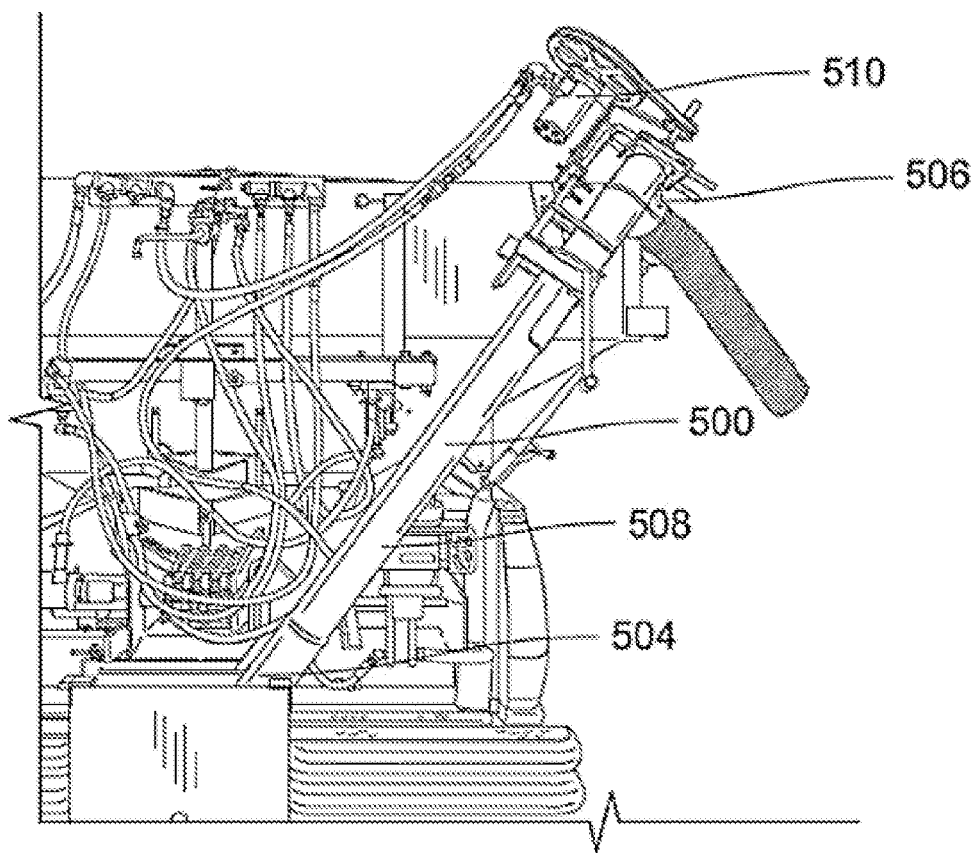
FIG. 5 shows a front view of a second conveyor apparatus.

Referring to FIGS. 5 and 6, the portable feed delivery system 100 further comprises a second conveyor apparatus 500 operably coupled to the second feed container 400. The second conveyor apparatus 500 comprises a second conveyor 502, which may be any conveyor known in the industry, including belt conveyors, augers, chains, belts, and the like. The second conveyor apparatus 500 has a loading end 504 disposed within the internal volume of the second feed container 400 and a dispensing end 506 disposed at a distance from the second feed container 400.

The second conveyor apparatus 500 further comprises a conveyor sheath 508 disposed about the second conveyor 502. The conveyor sheath 508 surrounds substantially the entire length of the second conveyor 502 with openings at the loading end 504 and the dispensing end 506. The openings are located to facilitate the loading and dispensing of feed at the respective ends of the second conveyor apparatus 500. The opening at the dispensing end 506 is configured to be directed generally downwards; however, the dispending end 506 may be angled at an angle of between 0 and 90 degrees depending upon the operation of the second conveyor apparatus 500.

As shown in FIG. 6, the conveyor sheath 508 is configured to engage with the conveyor attachment structure 408 at its loading end 504. As described above, the conveyer attachment structure 408 rotates about its longitudinal axis, thereby causing the second conveyer apparatus 500 to rotate accordingly. The rotation of the second conveyor apparatus 500 permits the conveyor sheath 508 to be disposed within the cutout 406 of the second feed container 400. Furthermore, in some embodiments, the conveyor attachment structure 408 comprises a rotation member 410 coupled to the conveyor sheath 508. In this embodiment, the engagement of the conveyor attachment structure 408 to the conveyor sheath 508 is accomplished via the rotation member 410. In the present embodiment, the rotation member 410 comprises a bearing. The rotation member 410 permits the second conveyor apparatus 500 to rotate about the longitudinal axis of the conveyor sheath 508.

As shown in FIG. 5, the portable feed delivery system 100 further comprises a second driving mechanism 510. The second driving mechanism 510 is operably associated with the second conveyor 502. In the present embodiment, where the second conveyor 502 comprises an auger, the second driving mechanism 510 comprises a hydraulic motor operably associated with a hydraulic pump that operates substantially as the hydraulic motor and hydraulic pump described above for the first conveyor apparatus 500. The second driving mechanism 510 may be disposed within the portable feed delivery system 100 wherever is desirable. In the present embodiment, the second driving mechanism 510 is attached to the dispensing end of the conveyor sheath 508 and defines a high point for the portable feed delivery system 100. The vertical distance between the lower surface of the second feed container 400 and the top of the driving mechanism 510 is preferably about 90 inches. In other embodiments, the distance may be lower, such as about 80 inches, alternatively, between about 1 and 1000 inches. In a further embodiment, the second driving mechanism 510 comprises an electric motor. The electric motor is associated with an electricity source, such as an electric generator or a battery associated with an engine, such as an internal combustion engine.

Figure 7:
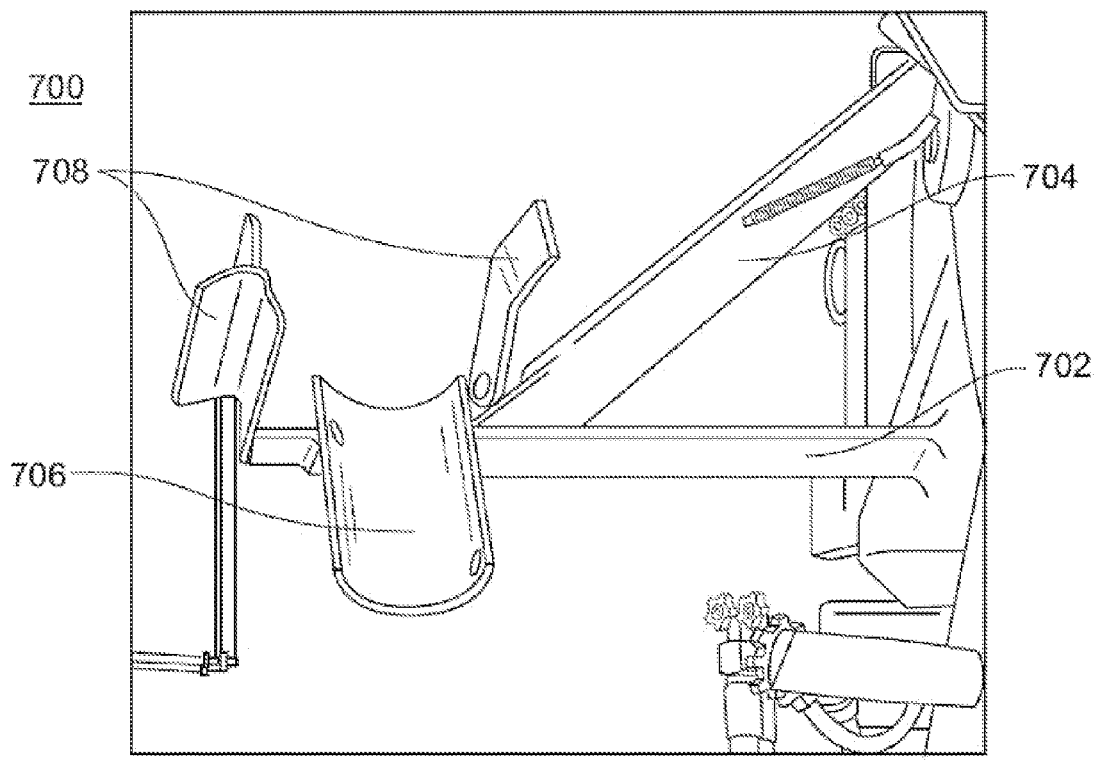
FIG. 7 shows a side view of a cradle.

Attached to an outside surface of the first feed container 110 is a cradle 700, as shown in FIG. 7. In one embodiment, the cradle 700 comprises an extension member 702 substantially parallel to the ground and attached at one end to the first feed container 110. The cradle 700 further comprises a support member 704 attached to the extension member 702 at one end and to an outside surface of the first feed container 110 at another end. The cradle 700 can further comprise a conforming support member 706 configured to conform to the shape of the outside surface of the conveyor sheath 508. In the present embodiment, the conforming support member 706 is configured to have a concave shape to conform to the tubular shape of the conveyor sheath 508. The conforming support member 706 is attached to the extension member 702 and positioned such that the conveyer sheath 508 rests upon the length of the conforming support member 706, permitting the cradle 700, in conjunction with the conveyer attachment structure 408, to support the weight of the second conveyer apparatus 500. In this embodiment, the interface between the conforming support member 706 and the conveyor sheath 508 inhibits the rotation of the conveyor sheath 508 about its longitudinal axis. The placement of the cradle 700 and the conforming support member 706 is configured to not interfere with the opening at the dispensing end of the conveyor sheath 508.

The cradle 700 can further comprise a pair of receiving members 708. The receiving members 708 extend generally perpendicular to the conforming support member 706 and include a tapered end at an end opposite the conforming support member 706. The receiving members 708 are spaced apart from each other a distance greater than the diameter of the conveyer sheath 508. The receiving members 708 are configured to guide the conveyor sheath 508 to interface with and rest upon the conforming support member 706.

In an alternative embodiment, the cradle 700 does not include a conforming support member 706. Instead of resting upon the conforming support member 706, the second conveyor apparatus 500 engages with and rests upon the extension member 702. In this embodiment, the interface between the extension member 702 and the conveyor sheath 508 is substantially lower in surface area than between the conforming support member 706 and the conveyor sheath 508, resulting in a corresponding reduction in the rotational inhibition imparted to the conveyor sheath 508.

Figure 8:
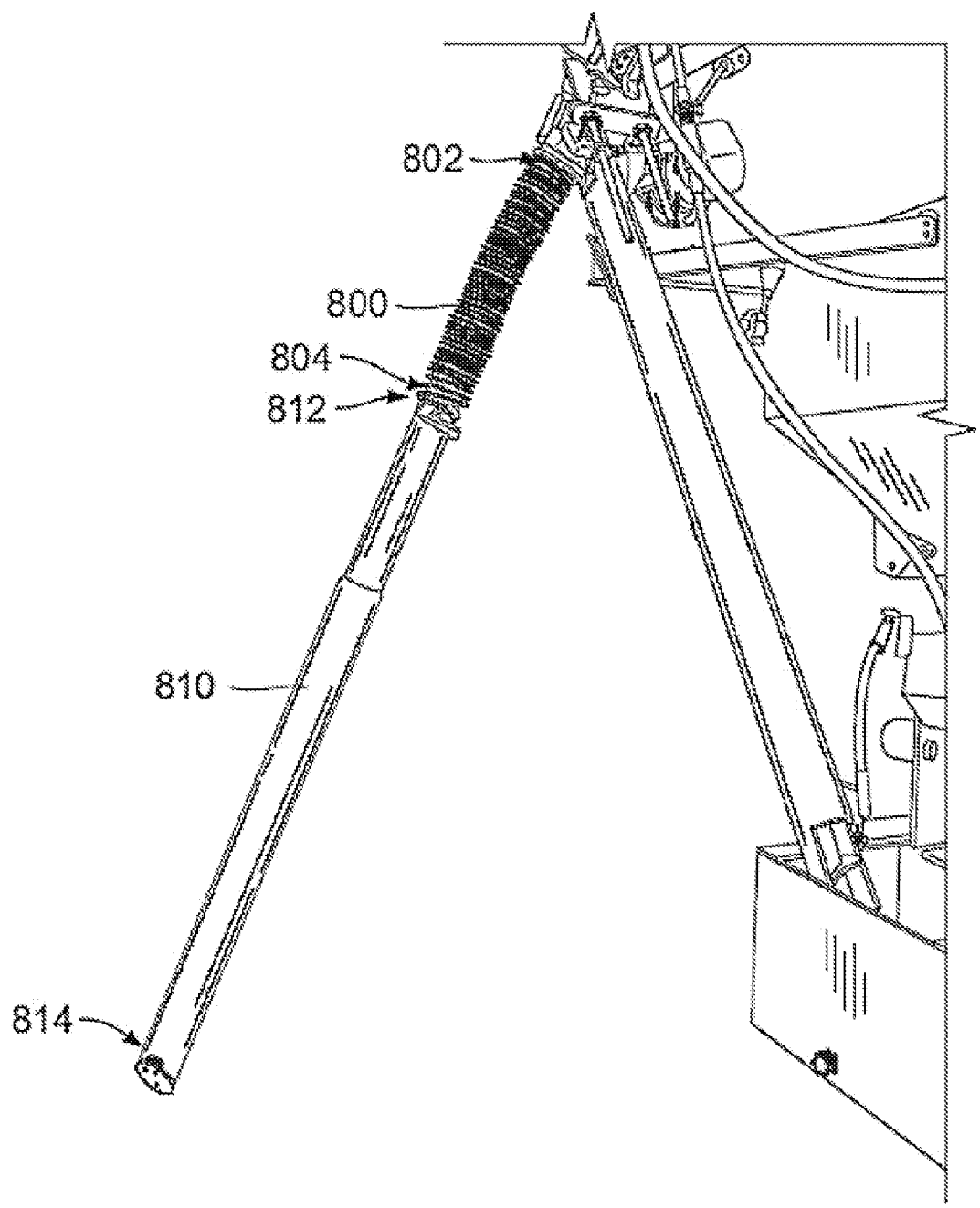
FIG. 8 shows an angled view of the second conveyor apparatus and first and second delivery conduits.

Referring to FIG. 8, the feed delivery system 100 further comprises a conduit apparatus comprising a first delivery conduit 800 and a second delivery conduit 810. The first delivery conduit comprises a receiving opening 802 at a receiving end and a dispensing opening 804 at a dispensing end, and the second delivery conduit 810 comprises a receiving opening 812 at a receiving end and a dispensing opening 814 at a receiving end. The first delivery conduit 800 is configured to transmit feed between the second conveyor assembly 500 and the second delivery conduit 810. The receiving end of the first delivery conduit 802 communicates with the dispensing end 506 of the second conveyor 500 and is positioned such that as feed exits the opening at the dispensing end 506 it falls into the receiving opening 802. The feed then passes through the length of the first conduit 800 and exits the dispensing opening 804.

In the present embodiment, the first conduit 800 is formed of a flexible material. The flexibility of the material forming the first conduit 800 permits an operator to direct the flow of feed out the dispensing end 804. The flexible material may be any polymer material, rubber material, and the like. In one embodiment, the flexible material is a corrugated structure as to extend longitudinally along the length of the first conduit 800 and be axially displaced by an operator.

The first conduit 800 is operably coupled to the second conduit 810 such that the dispensing opening 804 of the first conduit 800 communicates with the receiving opening 812 of the second delivery conduit 810. As feed passes through the dispensing opening 804, it enters the second conduit 810 through the receiving opening 812. The feed travels through the length of the second conduit 810 and to the dispensing end 814, where the feed exits the second conduit 810. In the present embodiment, the dispensing end 814 is configured to form a 45 degree angle with respect to the ground. Alternatively, the dispensing end 814 may be configured to form any angle with respect to the ground, depending on the operation of the feed system, such as to be about 0 to 180 degrees with respect to the ground.

In the present embodiment, the second conduit 810 is formed out of a rigid material. In operation, the flexible material forming the first conduit 800 allows a user to freely move the second conduit 810 and direct the flow of feed out the dispensing end 814.

Figure 9A:
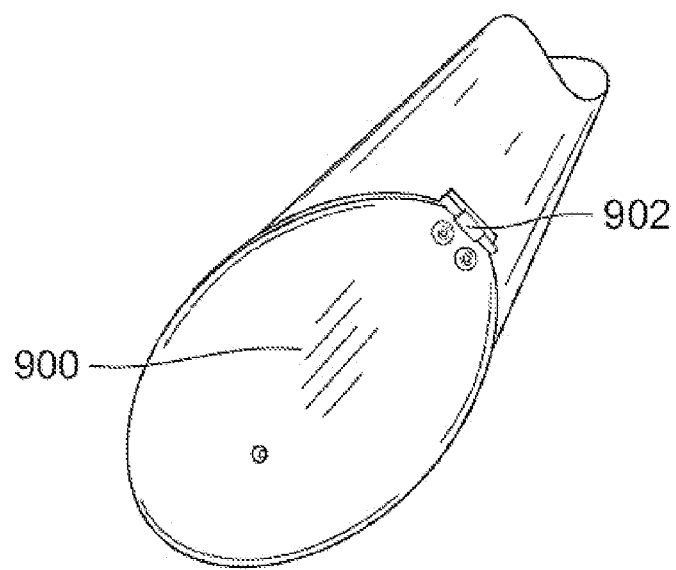
FIG. 9a shows a view of the end of the second conduit, showing a door in a closed position.
Figure 9B:
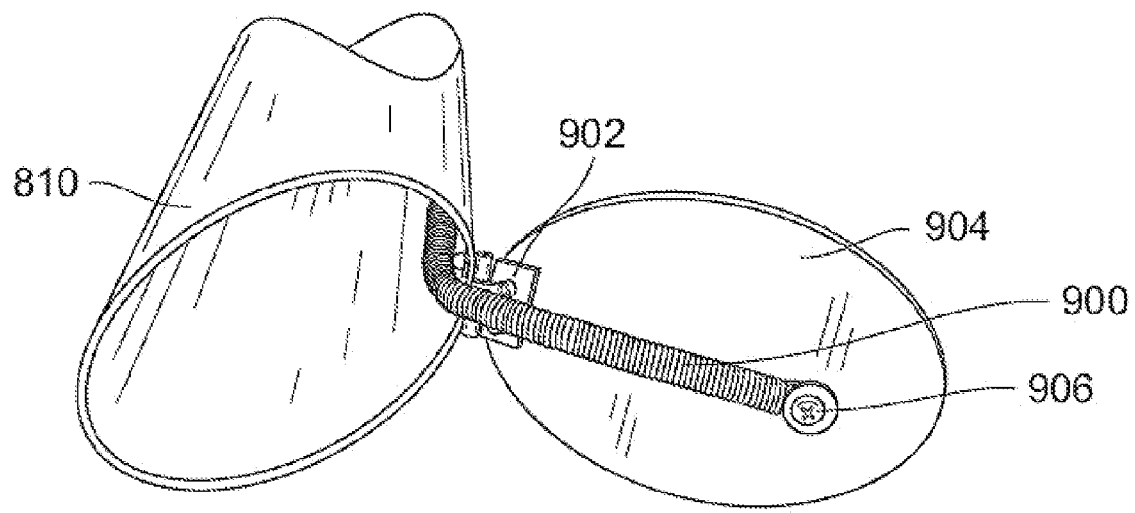
FIG. 9b shows the door of 9a in an open position.
Figure 10A:
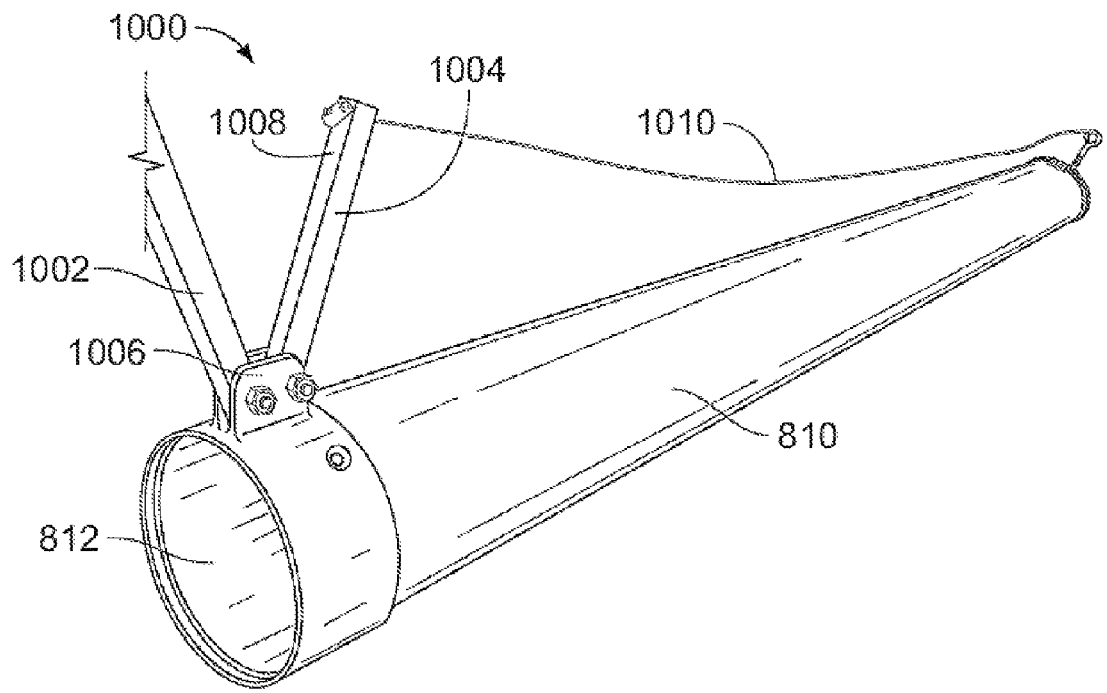
FIG. 10a shows a perspective view of the second conveyor apparatus having an operational handle.
Figure 10B:
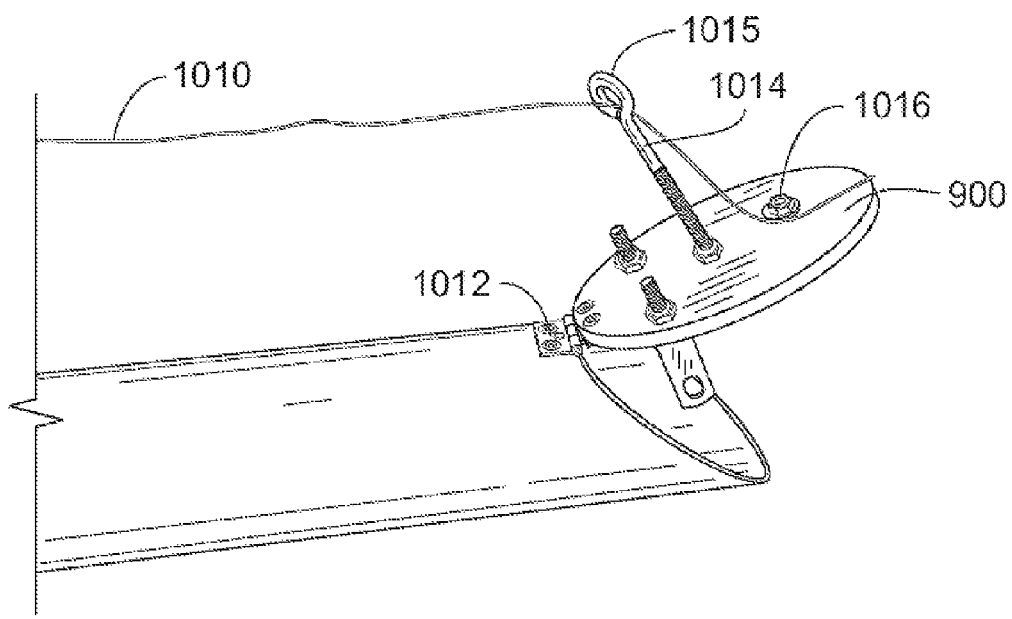
FIG. 10b shows the second conveyor apparatus of 10a showing the door in an open position.

The second conduit 810 further comprises a door 900 disposed over the dispensing end 814, as shown in FIGS. 9a-b. The door 900 is configured to optionally transition between an open state and a closed state, preferably the door 900 is biased to the closed state such as to substantially abut the dispensing end 814 and create a sealed opening thereon. When in the closed state, as shown in FIG. 9a, the door 900 blocks the dispensing end 814, preventing the passage of feed therethrough. When in the open state, the door 900 does not cover the dispensing end 814 and accordingly does not impede the flow of feed through the dispensing end 814. In one embodiment, the door 900 is maintained in the closed state by a retention mechanism. In the present embodiment, the retention mechanism may comprise a hinge 902, a tensioning member 904, and a tensioning member anchor 906. One side of the hinge 902 is attached to the second conduit 810 and the other side of the hinge 902 is attached to the door 900. The tensioning member 904 is attached at one end to the second conduit 810 and at another end to the door 900 by the tensioning member anchor 906. In a native state, the door 900 is held in the closed state by the tensioning member 904. When feed is dispensed through the second conduit 810, the weight of the feed counteracts the force applied by the tensioning member 904 and causes the door 900 to transition to the open state.

In a further embodiment, the retention mechanism comprises an operational handle 1000, a tensioning member 1010, a hinge 1012, an offsetting member 1014, and a tensioning member anchor 1016. The operational handle 1000 comprises a fixed arm 1002, a rotating arm 1004, and a base 1006. The base 1006 is affixed to the second conduit 810 some distance from the dispensing end 814. In the present embodiment, the base 1006 is affixed at the receiving end 812. The rotating arm 1004 is rotationally coupled to the base 1006 at one end, extends away from the base 1006, and includes an aperture 1008 at another end. The fixed arm 1002 is fixedly attached to the base 1006 at one end and extends away from the base 1006. The rotating arm 1004 can be positioned in a first state where the rotating arm 1004 extends some distance from the fixed arm 1002, or a second state where the rotating arm 1004 abuts or comes close to and is generally parallel to the fixed arm 1002.

The hinge 1012 is connected on one side to the second conduit 810 and on the other side to the door 900 allowing the door to rotate. The offsetting member 1014 is attached to the door 900 at one end and comprises a tensioning member guide 1015 at an opposite end that extends away from the door 900. In the present embodiment, the offsetting member 1014 comprises an eye bolt, where the tensioning member 1010 passes through the eye of the bolt. The tensioning member 1010 is attached to the rotating arm 1004 at the aperture 1008, is constrained by the tensioning member guide 1015, and is attached to the door 900 by the tensioning member anchor 1016. In the present embodiment, the tensioning member 1010 comprises a wire.

Furthermore, the present embodiment may include a second tensioning member as described above and shown in FIGS. 9a and 9b, whereby the second tensioning member causes the door 900 to transition from an open state to a closed state when the user does not hold the rotating arm 1004 in its second state. In other words, the user must overcome the force of the second tensioning member to transition the door 900 from the closed state to the open state by exerting a force on the rotating arm 1004 to transition the rotating arm 1004 from the first state and the second state, accordingly transitioning the door 900 from the closed state to the open state. When the user releases the rotating arm 1004, the second tensioning member exerts a force on the door 900 causing the door 900 to transition from the open state to the closed state, accordingly causing the rotating arm 1004 to transition from the second state to the first state.

In the present embodiment, the door 900 is natively in its closed state when the rotating arm 1004 is in the first state. When the rotating arm 1004 is transitioned from the first state to the second state, the tensioning member 1010 applies a force to the door 900 via the tensioning member anchor 1016.

In an alternative embodiment, the door 900 can have positions other than open or closed, positions that optionally cover more or less of the dispensing end 814 to selectively control the flow of feed through the dispensing end 814.

In an alternative embodiment, the portable feed delivery system 100 is installed onto a tractor, such as a skid loader or a track loader, having fork lift capability. As tractors typically include an onboard hydraulic system, the hydraulic pumps needed for some embodiments of the first conveyer apparatus 200 and the second conveyor apparatus 500 may be replaced by the onboard hydraulic system.

In this disclosure, there is shown and described the preferred embodiment and at least one alternative mechanical conveyance and transport vehicle. In both instances, the continuous delivery of feed is consistent and the end result of the ease of use by the operator is the same even though each conveyance or vehicle used illustrates different advantages and disadvantages. It is to be understood that the invention is capable of use in various other combinations and environments and is capable of changes or modification within the scope of the inventive concept as expressed herein.

What is claimed is:

1. A portable feed delivery system comprising:
    a first feed container comprising a plurality of walls having vertical regions and angled regions defining an interior volume, the walls forming a trough running along the longitudinal length of the first feed container and having an aperture at a dispensing end of the first feed container, and a baffle disposed above the trough;
    a first conveyor apparatus disposed within the trough and having a dispensing end extending out the aperture of the trough;
    a second feed container comprising a bottom surface and a plurality of walls defining an internal volume and an open upper area, further comprising a conveyor attachment structure disposed within the internal volume, the second feed container being positioned such that the open upper area is underneath the dispensing end of the first conveyor apparatus;
a second conveyor apparatus having a loading end and a dispensing end, the loading end being disposed within the internal volume of the second feed container and attached to the conveyor attachment structure, the second conveyor apparatus extending through the open upper area of the second feed container, and the dispensing end being located at an end of the second conveyor apparatus opposite the loading end; and
a conduit apparatus attached to the dispensing end of the second conveyor apparatus.

2. The feed delivery system of claim 1, wherein the first conveyor apparatus comprises:
a first conveyor selected from the group of conveyors consisting of belts, chains, and augers;
a first driving mechanism operably associated with the first conveyor; and
a power source operably associated with the first driving mechanism.

3. The feed delivery system of claim 1, wherein the first feed container further comprises a body member attached to the aperture of the trough and having a lower edge, and a flow restrictor attached to said lower edge forming a gap between the flow restrictor and the first conveyor apparatus, wherein the body member can be translated vertically.

4. The feed delivery system of claim 1, wherein the second conveyor apparatus further comprises:
a second conveyor; and
a conveyor sheath disposed about the second conveyor, the conveyor sheath having an opening at each of a loading end and a dispensing end of the conveyor sheath.

5. The feed delivery system of claim 4, wherein the second conveyor is a conveyor selected from the group of conveyors consisting of belts, chains, and augers.

6. The feed delivery system of claim 1, wherein the conduit apparatus comprises a first conduit and a second conduit, the first conduit being in communication with the second conveyor, and the second conduit being in communication with the first conduit.

7. The feed delivery system of claim 6, wherein the first conduit is formed of a flexible material.

8. The feed delivery system of claim 6, wherein the second conduit is formed of a rigid material.

9. The feed delivery system of claim 6, wherein the second conduit comprises a rotatable door and a retention mechanism configured to selectively cover an opening at a dispensing end of the second conduit.

10. The feed delivery system of claim 9, wherein the retention mechanism comprises a hinge, a first tensioning member, and a tensioning member anchor.

11. The feed delivery system of claim 10, wherein the retention mechanism further comprises an operational handle and an offsetting member.

12. The feed delivery system of claim 1, wherein the conveyor attachment structure comprises a rotation member.

13. The feed delivery system of claim 12, wherein the rotation member comprises a bearing.

14. The feed delivery system of claim 1, further comprising at least one cradle attached to an outside surface of the first feed container.

15. The feed delivery systems of claim 14, wherein the cradle comprises an extension member and a support member attached at one end to the extension member and at another end to the outside surface of the first feed container.

16. The feed delivery system of claim 15, further comprising a conforming support member and at least one receiving member.

17. A portable feed delivery system comprising:
a first feed container comprising:
a plurality of walls having vertical regions and angled regions defining an interior volume, the walls forming a trough running along the longitudinal length of the first feed container and having an aperture at a dispensing end of the first feed container;
a baffle disposed above the trough; and
a body member attached to the aperture of the trough and having a lower edge, and a flow restrictor attached to said lower edge forming a gap between the flow restrictor and the first conveyor apparatus, wherein the body member can be translated vertically;
a first conveyor apparatus disposed within the trough and having a dispensing end extending out the aperture of the trough comprising:
a first conveyor selected from the group of conveyors consisting of belts, chains, and augers;
a first driving mechanism operably associated with the first conveyor; and
a power source operably associated with the first driving mechanism;
a second feed container comprising a bottom surface and a plurality of walls defining an internal volume and an open upper area, further comprising a conveyor attachment structure comprising a bearing disposed within the internal volume, the second feed container being positioned such that the open upper area is underneath the dispensing end of the first conveyor apparatus;
a second conveyor apparatus having a loading end and a dispensing end, the loading end being disposed within the internal volume of the second feed container and attached to the conveyor attachment structure, the second conveyor apparatus extending through the open upper area of the second feed container, and the dispensing end being located at an end of the second conveyor apparatus opposite the loading end, comprising:
a second conveyor selected from the group of conveyors consisting of belts, chains, and augers; and
a conveyor sheath disposed about the second conveyor, the conveyor sheath having an opening at each of a loading end and a dispensing end of the conveyor sheath;
at least one cradle attached to an outside surface of the first feed container, each cradle comprising an extension member and a support member attached at one end to the extension member and at another end to the outside surface of the first feed container; and
a conduit apparatus attached to the dispensing end of the second conveyor apparatus comprising a first conduit formed of a flexible material and a second conduit formed of a rigid material, the first conduit being in communication with the second conveyor and the second conduit being in communication with the first conduit, the second conduit comprising a rotatable door and a retention mechanism configured to selectively cover an opening at a dispensing end of the second conduit.

18. The feed delivery system of claim 17, wherein each cradle further comprises a conforming support member and at least one receiving member.

19. The feed delivery system of claim 17, wherein the retention mechanism comprises a hinge, a first tensioning member, and a tensioning member anchor.

20. The feed delivery system of claim 19, wherein the retention mechanism further comprises an operational handle and an offsetting member.

* * * * *